US008676887B2

(12) United States Patent
Kim et al.

(10) Patent No.: US 8,676,887 B2
(45) Date of Patent: Mar. 18, 2014

(54) SOCIAL NEWS FORWARDING TO GENERATE INTEREST CLUSTERS

(75) Inventors: Eun-Gyu Kim, Mountain View, CA (US); Chris Kalaboukis, Los Gatos, CA (US)

(73) Assignee: Yahoo! Inc., Sunnyvale, CA (US)

( * ) Notice: Subject to any disclaimer, the term of this patent is extended or adjusted under 35 U.S.C. 154(b) by 1062 days.

(21) Appl. No.: 11/948,887

(22) Filed: Nov. 30, 2007

(65) Prior Publication Data

US 2009/0144377 A1    Jun. 4, 2009

(51) Int. Cl.
*G06F 15/16* (2006.01)
*G06Q 10/00* (2012.01)

(52) U.S. Cl.
USPC .......................... 709/204; 709/206; 705/1.1

(58) Field of Classification Search
USPC ...................................... 709/204, 206; 705/7
See application file for complete search history.

(56) References Cited

U.S. PATENT DOCUMENTS

| | | | |
|---|---|---|---|
| 5,974,442 A | 10/1999 | Adams | |
| 7,024,404 B1 | 4/2006 | Gerasoulis et al. | |
| 7,069,303 B2 | 6/2006 | Sikora et al. | |
| 7,174,382 B2 | 2/2007 | Ramanathan et al. | |
| 7,376,715 B2 | 5/2008 | Cunningham et al. | |
| 7,587,461 B2 | 9/2009 | Baluja et al. | |
| 7,765,265 B1 | 7/2010 | Granito et al. | |
| 8,146,001 B1 | 3/2012 | Reese | |
| 2002/0116466 A1* | 8/2002 | Trevithick et al. | 709/206 |
| 2002/0138581 A1 | 9/2002 | MacIntosh et al. | |
| 2004/0054733 A1* | 3/2004 | Weeks | 709/206 |
| 2004/0162071 A1 | 8/2004 | Grilli et al. | |
| 2005/0171954 A1* | 8/2005 | Hull et al. | 707/10 |
| 2005/0174975 A1* | 8/2005 | Mgrdechian et al. | 370/338 |
| 2005/0198160 A1* | 9/2005 | Shannon et al. | 709/206 |
| 2005/0203800 A1 | 9/2005 | Sweeney et al. | |
| 2005/0203801 A1* | 9/2005 | Morgenstern et al. | 705/14 |
| 2005/0278438 A1 | 12/2005 | Sandaire | |
| 2006/0042483 A1 | 3/2006 | Work et al. | |
| 2006/0136560 A1 | 6/2006 | Jiang | |

(Continued)

FOREIGN PATENT DOCUMENTS

EP    1591939 A2    11/2005

OTHER PUBLICATIONS

Pownce, Wikipedia, http://en.wikipedia.org/w/index.php?title-Pownce&Printable=yes, pp. 1-2, Nov. 27, 2007.

(Continued)

*Primary Examiner* — Ranodhi Serrao
(74) *Attorney, Agent, or Firm* — James J. DeCarlo; Greenberg Traurig, LLP (57) ABSTRACT

Embodiments are directed towards managing messages based on generated interest clusters. A message may be analyzed to determine one or more interest clusters associated with the message. The message may be automatically sent to members within the determined interest cluster(s), or if no members are in the interest cluster(s), to those identified in the sender's contact list. As recipients of the message respond to the message, the membership to the interest clusters may be revised. Responses used to revise the membership may include forwarding, reading, ignoring, or deleting the message. Subsequent revisions to the membership may be made based on responses to subsequent messages sent to the members of the interest cluster. Display of the message may be in a rank order based on a determined hop distance for the message. Third parties may use the interest cluster and/or sneezers to direct advertisements, or the like.

8 Claims, 6 Drawing Sheets

(56) References Cited

U.S. PATENT DOCUMENTS

| | | |
|---|---|---|
| 2006/0143236 A1 | 6/2006 | Wu |
| 2006/0173824 A1 | 8/2006 | Bensky et al. |
| 2006/0235873 A1 | 10/2006 | Thomas |
| 2006/0235933 A1 | 10/2006 | Baluja et al. |
| 2006/0271564 A1 | 11/2006 | Meng Muntz et al. |
| 2007/0088711 A1* | 4/2007 | Craggs ............ 707/10 |
| 2007/0088785 A1 | 4/2007 | Cama |
| 2007/0112761 A1 | 5/2007 | Xu et al. |
| 2007/0169165 A1 | 7/2007 | Crull et al. |
| 2007/0179945 A1 | 8/2007 | Marston et al. |
| 2007/0180043 A1 | 8/2007 | Vernal et al. |
| 2007/0252004 A1 | 11/2007 | Shiraki et al. |
| 2007/0255807 A1 | 11/2007 | Hayashi et al. |
| 2007/0271336 A1 | 11/2007 | Ramaswamy |
| 2008/0004944 A1 | 1/2008 | Calabria |
| 2008/0005108 A1 | 1/2008 | Ozzie et al. |
| 2008/0028294 A1 | 1/2008 | Sell et al. |
| 2008/0052369 A1 | 2/2008 | Weber et al. |
| 2008/0052371 A1 | 2/2008 | Partovi et al. |
| 2008/0301237 A1 | 12/2008 | Parsons et al. |
| 2009/0143051 A1 | 6/2009 | Kim |
| 2009/0144377 A1 | 6/2009 | Kim et al. |
| 2009/0157845 A1 | 6/2009 | Kim et al. |
| 2009/0158176 A1 | 6/2009 | Kalaboukis et al. |
| 2009/0319628 A1 | 12/2009 | Kumpula et al. |
| 2010/0042944 A1 | 2/2010 | Robinson et al. |
| 2010/0169492 A1 | 7/2010 | Lee |
| 2011/0066725 A1 | 3/2011 | Kim |
| 2011/0087734 A1 | 4/2011 | Parsons et al. |
| 2012/0041806 A1 | 2/2012 | Kim |

OTHER PUBLICATIONS

Pownce, Send stuff to your friends, http://pownce.com/, pp. 1-3, Nov. 27, 2007.

Office Communication for U.S. Appl. No. 11/947,647 mailed Apr. 15, 2010.

Office Communication for U.S. Appl. No. 11/957,069 mailed Oct. 26, 2009.

Office Communication for U.S. Appl. No. 11/957,069 mailed Jun. 4, 2010.

Official Communication for U.S. Appl. No. 11/947,647 mailed Aug. 19, 2010.

Official Communication for U.S. Appl. No. 11/947,647 mailed Nov. 29, 2010.

Official Communication for U.S. Appl. No. 12/947,782 mailed Apr. 4, 2011.

Official Communication for U.S. Appl. No. 12/947,782 mailed Jul. 22, 2011.

Official Communication for U.S. Appl. No. 11/957,069 mailed May 11, 2012.

Official Communication for U.S. Appl. No. 12/947,782 mailed Mar. 15, 2012.

Official Communication for U.S. Appl. No. 13/279,188 mailed Jun. 20, 2012.

* cited by examiner

SOCIAL NEWS FORWARDING TO GENERATE INTEREST CLUSTERS

TECHNICAL FIELD

The present invention relates generally to social networking and, more particularly, but not exclusively to managing communications by using a recipient's response to a message to generate interest clusters of members useable in receiving a related subsequent message.

BACKGROUND

Tremendous changes have been occurring in the Internet that influence our everyday lives. For example, online social networks have become the new meeting grounds. The development of such online social networks touch countless aspects of our everyday lives, providing instant access to people of similar mindsets, and enabling us to form partnerships with more people in more ways than ever before.

One aspect of our everyday lives that may be affected by online social networking technology is the ease in which news stories and other forms of gossip may be shared over the internet. Gossip and other forms of word-of-mouth communications have been considered to be a great source of news for centuries. However, all too often while some shared news or gossip may be interesting to some people; it may not be interesting to others. One approach for determining how interesting such shared news or gossip may be is to have people vote on it. The more often someone votes positively for an item, the more likely it is popular. However, merely because something is highly popular generally, it does not indicate that it is interesting to a particular audience. For example, the fact that a thousand people voted a particular article very high may say little about whether a different thousand people would find the article interesting at all. Thus, when a person has what they believe to be interesting news, gossip, or the like, it is often difficult to know to whom to send it to. Therefore, it is with respect to these considerations and others that the present invention has been made.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified.

For a better understanding of the present invention, reference will be made to the following Detailed Description, which is to be read in association with the accompanying drawings, wherein.

DETAILED DESCRIPTION

The present invention now will be described more fully hereinafter with reference to the accompanying drawings, which form a part hereof, and which show, by way of illustration, specific embodiments by which the invention may be practiced. This invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, the present invention may be embodied as methods or devices. Accordingly, the present invention may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments of the invention may be readily combined, without departing from the scope or spirit of the invention.

As used herein, the terms "social network" and "social community" refer to a concept that an individual's personal network of friends, family colleagues, coworkers, and the subsequent connections within those networks. A social network, for example, can be utilized to find more relevant connections for a variety of activities, including, but not limited to dating, job networking, service referrals, content sharing, like-minded individuals, activity partners, or the like.

An online social network refers to a person's set of direct and/or indirect personal relationships, including real and virtual privileges and permissions that users may associate with these people. Direct personal relationships refers to relationships with people the user communicates with directly, including family members, friends, colleagues, coworkers, and other people with which the person has had some form of direct contact, such as contact in person, by telephone, by email, by instant message, by letter, or the like. These direct personal relationships are sometimes referred to as first-degree relationships. First-degree relationships can have varying degrees of closeness, trust, and other characteristics.

Indirect personal relationships refer to relationships through first-degree relationships to people with whom a person has not had some form of direct or limited direct contact, such as in being cc'd on an e-mail message, or the like. For example, a friend of a friend represents an indirect personal relationship. A more extended, indirect relationship might be a friend of a friend of a friend. These indirect relationships are sometimes characterized by a degree of separation between the people. For instance, a friend of a friend can be characterized as two degrees of separation or a second-degree relationship. Similarly, a friend of a friend of a friend can be characterized as three degrees of separation or a third-degree relationship, and so forth.

The following briefly describes the embodiments of the invention in order to provide a basic understanding of some aspects of the invention. This brief description is not intended as an extensive overview. It is not intended to identify key or critical elements, or to delineate or otherwise narrow the scope. Its purpose is merely to present some concepts in a simplified form as a prelude to the more detailed description that is presented later.

Briefly stated, embodiments are directed towards managing messages based on automatically generated and managed interest clusters. A forwarding member of a social network may select to send a message over the network. Initially, the message may be analyzed to determine one or more potential interest clusters associated with the message. In one embodiment, the message may be automatically sent to members within the interest cluster(s) for which the message is associated. If the interest cluster(s) are new or otherwise empty of members, the message might be sent to those users in the sender's contact list. The recipients may then be automatically added and/or removed as members of the identified interest clusters based on their responses to the received message.

In one embodiment, the recipients may receive a score based on their responses. For example, in one embodiment, if the recipient selected to forward the received message, the recipient may be given a score value that is higher than if the recipient merely read the message. Similarly, recipients that ignored the received message might receive a different, or neutral score, while those recipients that deleted the message might receive a lowest score. Recipients may then be automatically added to various interest clusters associated with the message based, in part, on their scores. Subsequent messages associated with a populated interest cluster might be automatically forwarded to the members associated with the interest cluster, rather than sending the message to everyone in a member's contact list. In this manner, messages are more likely to be received by those in the social network that may have indicated an interest in a subject of the message. Members within an interest cluster may be removed based on subsequent responses to subsequent messages sent to the members of the interest cluster.

As the message is forwarded through a social network, the membership to an interest cluster may be revised. For example, a subsequent recipient of the message, not in the original sender's contact list, might be included in an interest cluster if the subsequent recipient selects to forward the message, or to read the message.

In one embodiment, as messages are received and forwarded by members within the social network, a hop distance may be determined. A hop distance may be determined by counting a number of times a message is forwarded. In one embodiment, the hop distance may be used to rank order a display of messages at a recipient's client device. In one embodiment, messages that are received but ignored for a period of time might be automatically deleted from the recipient's display. Similarly, received messages that are ignored and/or have a hop distance below a defined threshold for the period of time might also be automatically deleted from the recipient's display.

In one embodiment, the messages might be forwarded to members anonymously, for example, to encourage additional forwarding of the message. In one embodiment, the interest clusters may be provided to a member for use in selecting to whom the message is to be forwarded.

In one embodiment, while a name, alias, or the like, to the interest cluster might be exposed to the member, membership to the interest cluster might remain hidden.

In one embodiment, the interest clusters may be used by virtually any member of the interest cluster to send messages. In one embodiment, the interest cluster might be used by a third party to send directed advertising, marketing material, educational material, or the like.

In one embodiment, a category of members within the interest clusters might be identified as sneezers, or those that tend to forward messages more often than another category of members. In one embodiment, messages, including, but not limited to third party material may be sent to the sneezers to further increase a likelihood that the material will be forwarded.

Illustrative Operating Environment

Figure 1:
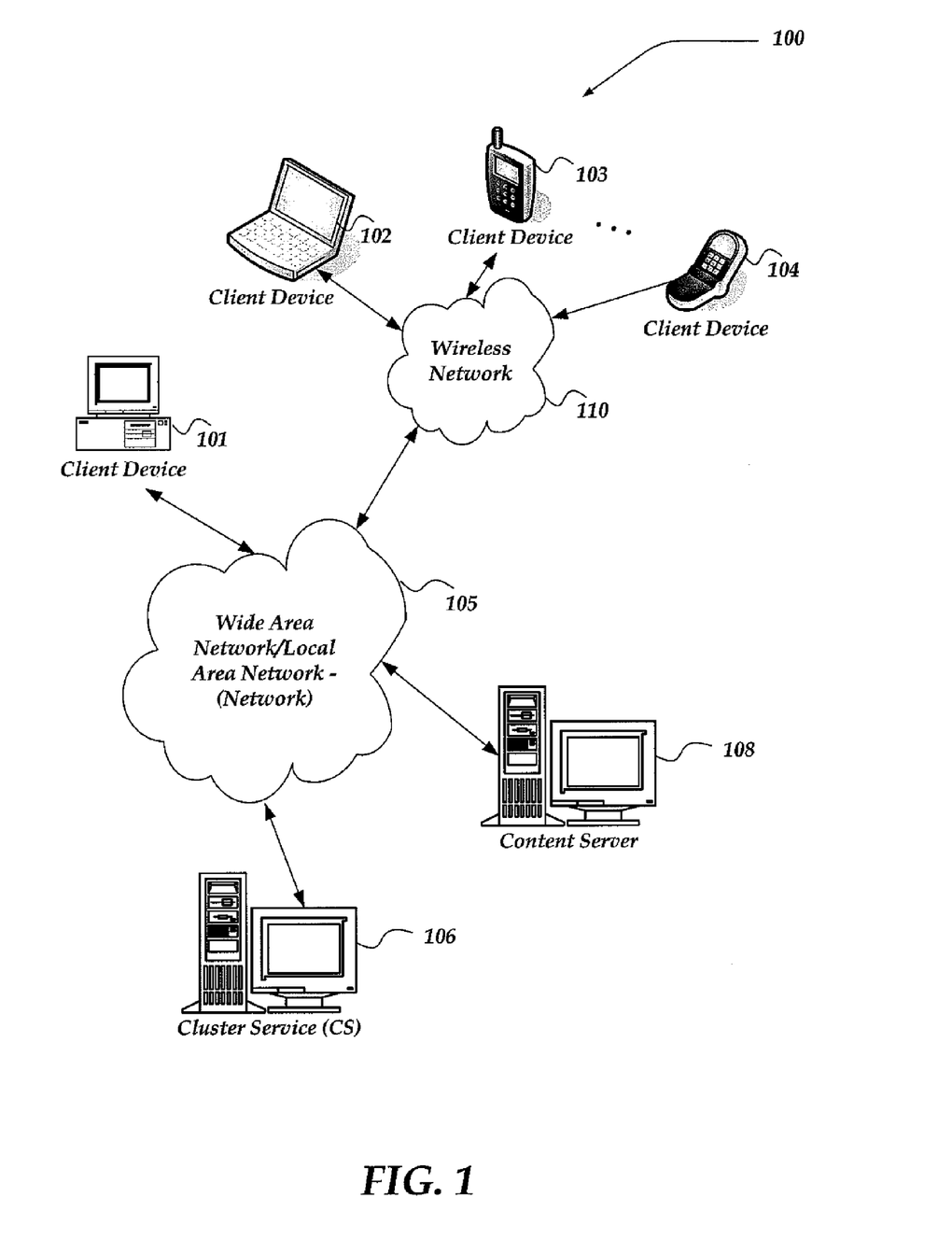
FIG. 1 is a system diagram of one embodiment of an environment in which the invention may be practiced.

FIG. 1 shows components of one embodiment of an environment in which the invention may be practiced. Not all the components may be required to practice the invention, and variations in the arrangement and type of the components may be made without departing from the spirit or scope of the invention. As shown, system 100 of FIG. 1 includes local area networks ("LANs")/wide area networks ("WANs")–(network) 105, wireless network 110, client devices 101-104, cluster service (CS) 106, and content server 108.

Generally, client devices 102-104 may include virtually any mobile computing device capable of receiving and sending a message over a network, such as wireless network 110, or the like. Such devices include portable devices such as, cellular telephones, smart phones, display pagers, radio frequency (RF) devices, infrared (IR) devices, Personal Digital Assistants (PDAs), handheld computers, laptop computers, wearable computers, tablet computers, integrated devices combining one or more of the preceding devices, or the like. One embodiment of a mobile device usable as one of client devices 102-104 is described in more detail below in conjunction with FIG. 2.

Client device 101 may include virtually any computing device that typically connects using a wired communications medium such as personal computers, multiprocessor systems, microprocessor-based or programmable consumer electronics, network PCs, or the like. In one embodiment, client devices 101-104 may be configured to operate over a wired and/or a wireless network.

Client devices 101-104 typically range widely in terms of capabilities and features. For example, a cell phone may have a numeric keypad and a few lines of monochrome LCD display on which only text may be displayed. In another example, a web-enabled client device may have a touch sensitive screen, a stylus, and several lines of color LCD display in which both text and graphics may be displayed.

A web-enabled client device may include a browser application that is configured to receive and to send web pages, web-based messages, or the like. The browser application may be configured to receive and display graphics, text, multimedia, or the like, employing virtually any web based language, including a wireless application protocol messages (WAP), or the like. In one embodiment, the browser application is enabled to employ Handheld Device Markup Language (HDML), Wireless Markup Language (WML), WML-Script, JavaScript, Standard Generalized Markup Language (SMGL), HyperText Markup Language (HTML), eXtensible Markup Language (XML), or the like, to display and send a message.

Client devices 101-104 also may include at least one other client application that is configured to receive content from another computing device. The client application may include a capability to provide and receive textual content, multimedia information, or the like. The client application may further provide information that identifies itself, including a type, capability, name, or the like. In one embodiment, client devices 101-104 may uniquely identify themselves through any of a variety of mechanisms, including a phone number, Mobile Identification Number (MIN), an electronic serial number (ESN), network address, or other device identifier. The information may also indicate a content format that the client device is enabled to employ. Such information may be provided in a message, or the like, sent to another computing device.

Client devices 101-104 may also be configured to communicate a message, such as through email, Short Message Service (SMS), Multimedia Message Service (MMS), instant messaging (IM), internet relay chat (IRC), Mardam-Bey's IRC (mIRC), Jabber, or the like, between another computing device. However, the present invention is not limited to these message protocols, and virtually any other message protocol may be employed.

Client devices 101-104 may further be configured to include a client application that enables the user to log into a user account that may be managed by another computing device, such as content server 108, cluster service 106, or the like. Such user account, for example, may be configured to enable the user to receive emails, send/receive IM messages, SMS messages, access selected web pages, participate in a social networking activity, provide messages that may include links or attachments, or the like. However, managing of messages may also be performed without logging into the user account.

Thus, a user of client devices 101-104 may employ any of a variety of client applications to access content, read articles, read messages, compose messages, send messages, or the like. In one embodiment, a user of client devices 101-104 may access a news article, or other item of interest from, for example, content server 108. The user may then select to forward a message to another user of one of client devices 101-104 about the accessed content, article, or the like.

The message may be forwarded using any of a variety of message protocols, including but not limited to SMS, IM, MMS, email, or the like. Moreover, in one embodiment, the forwarded message may include a reference to the content, article, or message using, for example, an attachment, a link, a copy of the content, article, or message within the forwarded message, or virtually any other mechanism. The user may select to forward the message as a form of gossip (or any other form of communications) to members of a social network. It should be noted that the term gossip as used herein refers to a classification of content. However, the invention is not limited to merely managing gossip messages, and any content may be managed using the invention.

In one embodiment, the message may be forwarded anonymously such that the recipients may not readily determine from whom the message is actually forwarded. This may be performed in a variety of ways. For example, in one embodiment, a header of the forwarded message indicating a source of the message may be blank, may include an alias, a fake identifier, or the like.

When another user receives the forwarded message, that recipient user may select to ignore the message, read the message, delete the message, or forward the message to at least one other user of one of client devices 101-104. In one embodiment, as the message is forwarded to other members in the social network, a hop distance may be determined in real-time. In one embodiment, the hop distance may be determined by cluster service 106 and provided to each client device receiving and/or forwarding the message. However, the invention is not so limited, and the hop distance may be determined using any of a variety of other mechanisms. For example, in one embodiment, one or more client devices receiving and/or forwarding the message may determine the hop distance. This may be performed using a variety of ways, including for example, including with the message information about a number of hops the message traversed to reach a recipient; sending an acknowledgement back through a chain of forwarding client devices where the acknowledgments may be used to determine the hop distance; or any of a variety of other ways. Thus, in one embodiment, the hop distance may be determined using any of a variety of peer-to-peer approaches, a server based approach, or even a combination of peer-to-peer and server based approach.

In any event, the hop distance may then be displayed at a client device, in one embodiment, along with the message, to indicate a level of interest by the members of the social network. That is, the more times the message is forwarded by different users in a sequence of users (e.g., client devices) the greater the determined hop distance. Thus, a user may view the hop distance as an indicator of how interesting or newsworthy the message may be.

In one embodiment, to whom the message is to be forwarded may be determined automatically based on an address book, buddy list, or any form of contact list associated with the user requesting the message to be forwarded. For example, a user may employ a client application to indicate that a message is to be forwarded. When the indication is received by the client device, or other network device, the user's contact list may be examined to determine to whom to forward the message.

However, in another embodiment, the message might be analyzed to determine one or more interest clusters associated with the message. Such interest clusters may be based, for example, on parsing content of the message to identify one or more words, and identifying interest clusters based on the identified word(s). For example, content might include words associated with sports, friends, entertainment, or the like. Such words may then be used to identify one or more interest clusters. In one embodiment, as more messages are identified, interest clusters may be organized based on various relationships. For example, interest clusters might be organized into a hierarchical relationship, such as fishing, and hunting within outdoor sports; chess, and cards, within indoor sports; with indoor and outdoor sports being within a general interest cluster of sports. Similarly, different messages may be associated with one or more same interest clusters. It should be clear, however, that interest clusters may be organized based on other than a hierarchical relationship, and virtually any other relationship may be used. Moreover, in one embodiment, the interest clusters might be managed as being unrelated to each other.

In any event, if members are identified with an interest cluster associated with the message, then the interest cluster might be made available for use in determining to whom the message is to be sent. In one embodiment, a display may be provided to a sender of the message from which the sender may select the interest cluster to use to send the message. In one embodiment, all interest clusters for which the sender is a member may be displayed to the sender, independent of whether the message is associated with the interest cluster. In another embodiment, those interest clusters for which the message is associated might be displayed, while other interest clusters may remain hidden or otherwise unavailable to the sender for selection. One embodiment of an interface useable to display and otherwise manage messages using interest clusters is described in more detail below in conjunction with FIG. 6.

As the message is forwarded to the determined recipients of the message, cluster service 106 may revise membership to one or more interest clusters based on a response of the recipient to the message. For example, if the recipient selects not to read the message and instead deletes it, cluster service 106 may select to delete that recipient from one or more interest clusters. In another embodiment, if the recipient selects to merely ignore the message (e.g., neither deleting, reading, nor forwarding the message) the recipient might be selectively removed from one or more interest clusters. That is, the recipient might be retained as a member or removed from the interest cluster. In one embodiment, removal might be based on a single message response by the recipient. However, in another embodiment, the removal might be based on responses by the recipient to a defined number of subsequent messages associated with the interest cluster. Similarly, if a recipient reads and/or forwards the received message, the recipient might be added to one or more interest clusters associated with the message. Moreover, those recipients identified as forwarding messages a defined number of times might be additionally classified as sneezers—those having an increased tendency to forward received messages over another recipient.

Wireless network 110 is configured to couple client devices 102-104 with network 105. Wireless network 110 may include any of a variety of wireless sub-networks that may further overlay stand-alone ad-hoc networks, or the like, to provide an infrastructure-oriented connection for client devices 102-104. Such sub-networks may include mesh networks, Wireless LAN (WLAN) networks, cellular networks, or the like.

Wireless network 110 may further include an autonomous system of terminals, gateways, routers, or the like connected by wireless radio links, or the like. These connectors may be configured to move freely and randomly and organize themselves arbitrarily, such that the topology of wireless network 110 may change rapidly.

Wireless network 110 may further employ a plurality of access technologies including 2nd (2G), 3rd (3G) generation radio access for cellular systems, WLAN, Wireless Router (WR) mesh, or the like. Access technologies such as 2G, 3G, and future access networks may enable wide area coverage for client devices, such as client devices 102-104 with various degrees of mobility. For example, wireless network 110 may enable a radio connection through a radio network access such as Global System for Mobile communication (GSM), General Packet Radio Services (GPRS), Enhanced Data GSM Environment (EDGE), Wideband Code Division Multiple Access (WCDMA), Bluetooth, or the like. In essence, wireless network 110 may include virtually any wireless communication mechanism by which information may travel between client devices 102-104 and another computing device, network, or the like.

Network 105 is configured to couple cluster service 106 and its components with other computing devices, including, content server 108, client device 101, and through wireless network 110 to client devices 102-104. Network 105 is enabled to employ any form of computer readable media for communicating information from one electronic device to another. Also, network 105 can include the Internet in addition to local area networks (LANs), wide area networks (WANs), direct connections, such as through a universal serial bus (USB) port, other forms of computer-readable media, or any combination thereof. On an interconnected set of LANs, including those based on differing architectures and protocols, a router acts as a link between LANs, enabling messages to be sent from one to another. Also, communication links within LANs typically include twisted wire pair or coaxial cable, while communication links between networks may utilize analog telephone lines, full or fractional dedicated digital lines including T1, T2, T3, and T4, Integrated Services Digital Networks (ISDNs), Digital Subscriber Lines (DSLs), wireless links including satellite links, or other communications links known to those skilled in the art. Furthermore, remote computers and other related electronic devices could be remotely connected to either LANs or WANs via a modem and temporary telephone link. In essence, network 105 includes any communication method by which information may travel between computing devices.

Additionally, communication media typically embodies computer-readable instructions, data structures, program modules, or other data in a modulated data signal such as a carrier wave, data signal, or other transport mechanism and includes any information delivery media. The terms "modulated data signal," and "carrier-wave signal" includes a signal that has one or more of its characteristics set or changed in such a manner as to encode information, instructions, data, or the like, in the signal. By way of example, communication media includes wired media such as twisted pair, coaxial cable, fiber optics, wave guides, and other wired media and wireless media such as acoustic, RF, infrared, and other wireless media.

One embodiment of cluster server 106 is described in more detail below in conjunction with FIG. 3. Briefly, however, cluster service 106 may include any computing device capable of connecting to network 105 to enable managing of messages within a social network using generated interest clusters. In one embodiment, cluster service 106 may provide an interface to a user of client devices 101-104 that may be used to post, spread, delete, or otherwise manage distribution of messages, including gossip messages.

Cluster service 106 may further dynamically determine hop distances for respective messages, enable rank ordering of messages for a client device, and enable automatic deletion of a message based, in part, on hop distance. In one embodiment, cluster service 106 may further dynamically revise membership to an interest cluster associated with a message based on a response to the message by a message recipient. In one embodiment, if a message is ignored by a message recipient for a defined time period, the message may also be automatically deleted from a display of messages to the recipient.

Cluster service 106 may, in one embodiment, provide to a client device, a determined hop distance for display with a respective message. In one embodiment, the hop distance may be configured to be dynamically updated in real-time for the client device as the message is forwarded through a social network of users, such as might be represented by client devices 101-104, or the like. In one embodiment, cluster service 106 might be configured to determine hop distance based on how a user of a client device responds to a received message. For example, in one embodiment, where a user receives a message and selects to forward the message to another client device, the hop distance might be determined based on a longest sequence of client devices for which the message is forwarded. In one embodiment, the hop distance displayed at a client device might be independent of whether the user forwarded the message or did not forward the message. That is, in one embodiment, the user might always see the hop distance to reflect the longest sequence, even if that user is not within the longest sequence of users. In another embodiment, if the user is not within the longest sequence, the hop distance displayed for that user might reflect the length of the sequence of users for which that user is a member. However, the displayed hop distance for a given user is not limited to these embodiments, and any of a variety of other hop distances may be determined for display at a client device, without limiting the scope of the invention.

As noted, cluster service 106 may determine one or more interest clusters for which a message is associated. In one embodiment, cluster service 106 may make such determination by performing an analysis of the message. Cluster service 106 may then manage membership to the one or more interest clusters based on how a recipient of the message responds to the message. Cluster service 106 may, in one embodiment, provide the interest clusters to a member of the interest cluster for use in forwarding messages. Cluster service 106 also may provide an interface useable in selecting and using interest clusters to manage messages.

Cluster service 106 may further provide selective access to one or more interest clusters to a third party, such as content server 106, or the like. In such situations, the third party might employ the interest cluster to send directed messages that may include, but are not limited to, advertisements, marketing material, educational material, or the like. Cluster service 106 may also determine one or more sneezers based on their response to received messages. In one embodiment, a sneezer list may be organized based on interest clusters. The sneezer list may then be made available to a third party or even members of one or more interest clusters, for use in directing messages. Cluster service 106 may employ a process substantially similar to the process described below in conjunction with FIG. 4 to perform at least some of its actions.

It should be noted that while FIG. 1 illustrates a use of cluster service 106 to manage messages based on hop distances and/or interest clusters, the invention is not so limited. For example, as noted above, client devices 101-104 may also be configured with a client application, script, plug-in, applet, or the like, that is configured and arranged to enable the client device to manage messages using hop distances, and/or interest clusters. Moreover, in another embodiment, various functions performed by cluster service 106 may be distributed across a plurality of network devices.

Devices that may operate as cluster service 106 include personal computers, desktop computers, multiprocessor systems, microprocessor-based or programmable consumer electronics, network PCs, servers, or the like.

Content server 108 includes virtually any network computing device that is configured to provide various resources, including content and/or services over network 105. As such, content server 108 represents one embodiment of a content system. Content server 108 may provide access to any of a variety of content, including, but not limited to messages, such as emails, SMS messages, IM messages; search results; news; articles; websites; hyperlinks; ads; reviews; as well as content that may include audio files, video files, text files, streaming files, graphical files, or the like. Thus, virtually any content may be available through content server 108 for access by client devices 101-104. In one embodiment, content server 108 might be configured and arranged to provide a website for users to post, view, link to, and/or otherwise access, content. Content server 108 might also provide FTP services, APIs, web services, database services, or the like, to enable users to access content. In addition, content server 108 may also provide a messaging service, such as an email server, text messaging server, or the like. However, content server 108 is not limited to these mechanisms, and/or content, and others are envisaged as well.

Content server 108 may include an interface that may request information from a user of client devices 101-104. For example, content server 108 may provide access to an account, which may request user log-in information. Such log-in information may include a user name, password, or other identifier of the user and/or client device used by the user. Moreover, content server 108 may also be configured to manage information for a user, such as an address book, buddy list, or other type of contact list. Such contact lists may be made available to cluster service 106, in one embodiment.

Content server 108 may also operate to provide third party information to one or more client devices 101-104 using, for example, interest clusters, sneezers, or the like.

Devices that may operate as content server 108 include, but are not limited to personal computers, desktop computers, multiprocessor systems, microprocessor-based or programmable consumer electronics, network PCs, servers, network appliances, and the like.

Illustrative Client Environment

Figure 2:
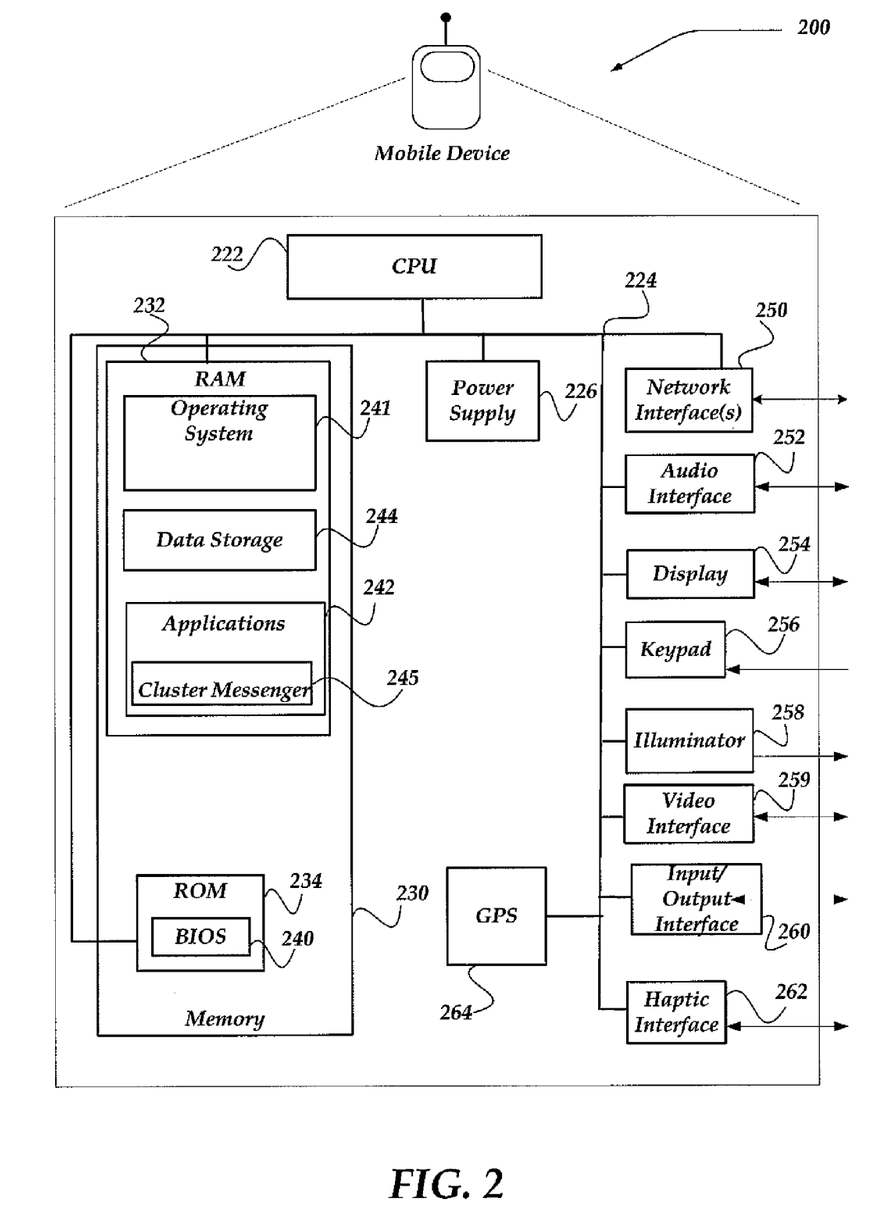
FIG. 2 shows one embodiment of a mobile device that may be included in a system implementing the invention.

FIG. 2 shows one embodiment of mobile device 200 that may be included in a system implementing the invention. Mobile device 200 may include many more or less components than those shown in FIG. 2. However, the components shown are sufficient to disclose an illustrative embodiment for practicing the present invention. Mobile device 200 may represent, for example, one of client devices 102-104 of FIG. 1.

As shown in the figure, mobile device 200 includes a processing unit (CPU) 222 in communication with a mass memory 230 via a bus 224. Mobile device 200 also includes a power supply 226, one or more network interfaces 250, an audio interface 252, video interface 259, a display 254, a keypad 256, an illuminator 258, an input/output interface 260, a haptic interface 262, and an optional global positioning systems (GPS) receiver 264. Power supply 226 provides power to mobile device 200. A rechargeable or non-rechargeable battery may be used to provide power. The power may also be provided by an external power source, such as an AC adapter or a powered docking cradle that supplements and/or recharges a battery.

Mobile device 200 may optionally communicate with a base station (not shown), or directly with another computing device. Network interface 250 includes circuitry for coupling mobile device 200 to one or more networks, and is constructed for use with one or more communication protocols and technologies including, but not limited to, global system for mobile communication (GSM), code division multiple access (CDMA), time division multiple access (TDMA), user datagram protocol (UDP), transmission control protocol/Internet protocol (TCP/IP), SMS, general packet radio service (GPRS), WAP, ultra wide band (UWB), IEEE 802.16 Worldwide Interoperability for Microwave Access (WiMax), SIP/RTP, Bluetooth™, infrared, Wi-Fi, Zigbee, or any of a variety of other wireless communication protocols Network interface 250 is sometimes known as a transceiver, transceiving device, or network interface card (NIC).

Audio interface 252 is arranged to produce and receive audio signals such as the sound of a human voice. For example, audio interface 252 may be coupled to a speaker and microphone (not shown) to enable telecommunication with others and/or generate an audio acknowledgement for some action. Display 254 may be a liquid crystal display (LCD), gas plasma, light emitting diode (LED), or any other type of display used with a computing device. Display 254 may also include a touch sensitive screen arranged to receive input from an object such as a stylus or a digit from a human hand.

Video interface 259 is arranged to capture video images, such as a still photo, a video segment, an infrared video, or the like. For example, video interface 259 may be coupled to a digital video camera, a web-camera, or the like. Video interface 259 may comprise a lens, an image sensor, and other electronics. Image sensors may include a complementary metal-oxide-semiconductor (CMOS) integrated circuit, charge-coupled device (CCD), or any other integrated circuit for sensing light.

Keypad 256 may comprise any input device arranged to receive input from a user. For example, keypad 256 may include a push button numeric dial, or a keyboard. Keypad 256 may also include command buttons that are associated with selecting and sending images. Illuminator 258 may provide a status indication and/or provide light. Illuminator 258 may remain active for specific periods of time or in response to events. For example, when illuminator 258 is active, it may backlight the buttons on keypad 256 and stay on while the client device is powered. Also, illuminator 258 may backlight these buttons in various patterns when particular actions are performed, such as dialing another client device. Illuminator 258 may also cause light sources positioned within a transparent or translucent case of the client device to illuminate in response to actions.

Mobile device 200 also comprises input/output interface 260 for communicating with external devices, such as a headset, or other input or output devices not shown in FIG. 2. Input/output interface 260 can utilize one or more communication technologies, such as USB, infrared, Bluetooth™, Wi-Fi, Zigbee, or the like. Haptic interface 262 is arranged to provide tactile feedback to a user of the client device. For example, the haptic interface may be employed to vibrate mobile device 200 in a particular way when another user of a computing device is calling.

Optional GPS transceiver 264 can determine the physical coordinates of mobile device 200 on the surface of the Earth, which typically outputs a location as latitude and longitude values. GPS transceiver 264 can also employ other geo-positioning mechanisms, including, but not limited to, triangulation, assisted GPS (AGPS), E-OTD, CI, SAI, ETA, BSS or the like, to further determine the physical location of mobile device 200 on the surface of the Earth. It is understood that under different conditions, GPS transceiver 264 can determine a physical location within millimeters for mobile device 200; and in other cases, the determined physical location may be less precise, such as within a meter or significantly greater distances. In one embodiment, however, a client device may through other components, provide other information that may be employed to determine a physical location of the device, including for example, a MAC address, IP address, or the like.

Mass memory 230 includes a RAM 232, a ROM 234, and other storage means. Mass memory 230 illustrates another example of computer storage media for storage of information such as computer readable instructions, data structures, program modules or other data. Mass memory 230 stores a basic input/output system ("BIOS") 240 for controlling low-level operation of mobile device 200. The mass memory also stores an operating system 241 for controlling the operation of mobile device 200. It will be appreciated that this component may include a general purpose operating system such as a version of UNIX, or LINUX™, or a specialized client communication operating system such as Windows Mobile™, or the Symbian® (operating system. The operating system may include, or interface with a Java virtual machine module that enables control of hardware components and/or operating system operations via Java application programs.

Memory 230 further includes one or more data storage 244, which can be utilized by mobile device 200 to store, among other things, applications 242 and/or other data. For example, data storage 244 may also be employed to store information that describes various capabilities of mobile device 200. The information may then be provided to another device based on any of a variety of events, including being sent as part of a header during a communication, sent upon request, or the like. Moreover, data storage 244 may also be employed to store personal information including but not limited to address lists, contact lists, personal preferences, or the like. Data storage 244 may also include some profile information. At least a portion of the information may also be stored on a disk drive or other storage medium (not shown) within mobile device 200.

Applications 242 may include computer executable instructions which, when executed by mobile device 200, transmit, receive, and/or otherwise process messages (e.g., SMS, MMS, IM, email, and/or other messages), multimedia information, and enable telecommunication with another user of another client device. Other examples of application programs include calendars, browsers, email clients, IM applications, SMS applications, VoIP applications, contact managers, task managers, transcoders, database programs, word processing programs, security applications, spreadsheet programs, games, search programs, and so forth. Applications 242 may also include cluster messenger (CM) 245. In one embodiment, CM 245 may be a browser application. In another embodiment, CM 245 may be a browser application with a downloadable plug-in, script, applet, or the like, that is configured and arranged to manage messages using interest clusters, and/or hop distances.

CM 245 may include a browser application configured to receive and display graphics, text, multimedia, and the like, employing virtually any web based language. In one embodiment, the browser application is enabled to employ Handheld Device Markup Language (HDML), Wireless Markup Language (WML), WMLScript, JavaScript, Standard Generalized Markup Language (SMGL), HyperText Markup Language (HTML), eXtensible Markup Language (XML), and the like, to display and send a message. However, any of a variety of other web based languages may be employed.

CM 245 may further be configured as a messenger application that is configured to send, to receive, and/or to otherwise process messages using SMS, MMS, IM, email, VoIP, and/or any of a variety of other messaging communication protocols. Although a single CM 245 is illustrated it should be clear that multiple applications may be employed. For example, one CM 245 may be configured to manage SMS messages, where another application may manage IM messages, and yet another messaging client is configured to manage emails, or the like, with one or more of such applications being able to manage messages using interest clusters and/or hop distances. One embodiment of an interface useable on mobile device 200 for managing messages is described in more detail below in conjunction with FIG. 6.

In one embodiment, CM 245 may be configured and arranged to manage forwarding of a message. For example, where the user requests that a message be forwarded, CM 245 might automatically determine a list of recipients to whom the message is to be forwarded. In one embodiment, CM 245 might employ a contact list, or the like, to make such a determination. CM 245 may, in one embodiment, automatically determine one or more interest clusters associated with the message, and employ the membership in the one or more interest clusters to forward the message. In one embodiment, CM 245 may display one or more interest clusters by name or the like, for a user to select and use to forward the message.

Illustrative Network Device Environment

Figure 3:
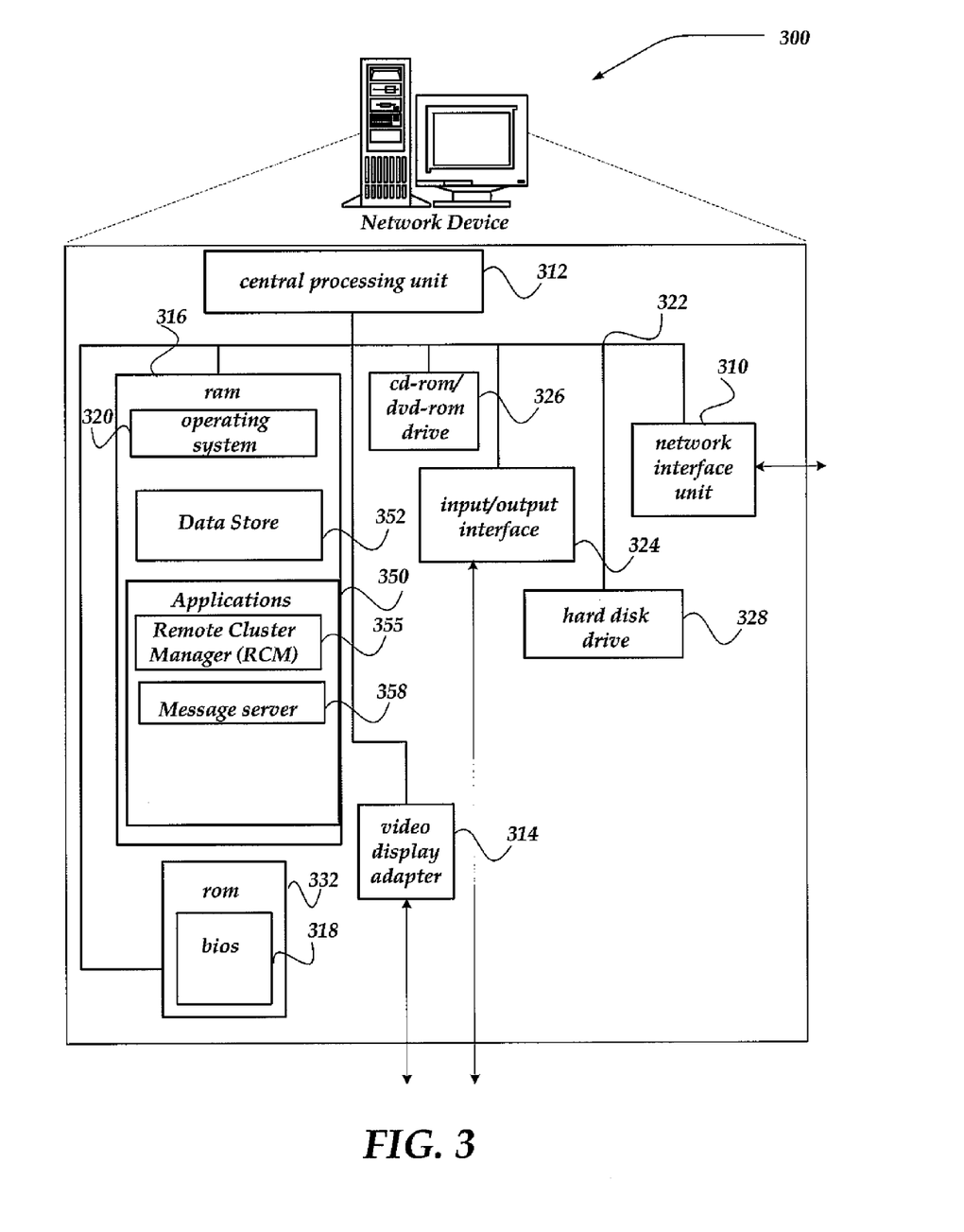
FIG. 3 shows one embodiment of a network device that may be included in a system implementing the invention.

FIG. 3 shows one embodiment of a network device, according to one embodiment of the invention. Network device 300 may include many more components than those shown. The components shown, however, are sufficient to disclose an illustrative embodiment for practicing the invention. Network device 300 may represent, for example, cluster service 106 of FIG. 1.

Network device 300 includes processing unit 312, video display adapter 314, and a mass memory, all in communication with each other via bus 322. The mass memory generally includes RAM 316, ROM 332, and one or more permanent mass storage devices, such as hard disk drive 328, tape drive, optical drive, and/or floppy disk drive. The mass memory stores operating system 320 for controlling the operation of network device 300. Any general-purpose operating system may be employed. Basic input/output system ("BIOS") 318 is also provided for controlling the low-level operation of network device 300. As illustrated in FIG. 3, network device 300 also can communicate with the Internet, or some other communications network, via network interface unit 310, which is constructed for use with various communication protocols including the TCP/IP protocol. Network interface unit 310 is sometimes known as a transceiver, transceiving device, or network interface card (NIC).

The mass memory as described above illustrates another type of computer-readable media, namely computer storage media. Computer storage media may include volatile, nonvolatile, removable, and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computing device.

The mass memory also stores program code and data. One or more applications 350 are loaded into mass memory and run on operating system 320. Examples of application programs may include transcoders, schedulers, calendars, database programs, word processing programs, HTTP programs, customizable user interface programs, IPSec applications, encryption programs, security programs, VPN programs, web servers, account management, and so forth. Applications 350 may include Remote Cluster Manager (RCM) 355 and message server 358.

Message server 358 may include virtually any computing component or components configured and arranged to forward messages from message user agents, and/or other message servers, or to deliver messages to a local message store, such as data store 352, or the like. Thus, message server 358 may include a message transfer manager to communicate a message employing any of a variety of email protocols, including, but not limited to Simple Mail Transfer Protocol (SMTP), Post Office Protocol (POP), Internet Message Access Protocol (IMAP), NNTP, or the like.

However, message server 358 is not constrained to email messages, and other messaging protocols may also be managed by one or more components of message server 358. Thus, message server 358 may also be configured to manage SMS messages, IM, MMS, IRC, mIRC, or any of a variety of other message types. Moreover message server 358 may also represent a web server configured to enable access to and/or management of messages.

In one embodiment, message server 358 may communicate with RCM 355 to enable a user to manage messages using interest clusters, and optionally hop distances. In one embodiment, RCM 355 may provide a script, applet, application, or other downloadable component, to a client device for use in managing messages using interest clusters and optionally hop distances. In another embodiment, RCM 355 may provide information to message server 358, including an interface, or the like, for use in displaying, and/or otherwise managing messages. Although not illustrated, in one embodiment, RCM 355 may be configured as a plug-in, or the like, to message server 358.

In one embodiment, message server 358 may be configured and arranged to receive a message. In one embodiment, the message may be associated with hop distance information. RCM 355 may receive the hop distance information, and/or otherwise determine in real-time a hop distance for the message based on the received information. The determined hop distance may then be provided to message server 358 for display with the message. In one embodiment, the hop distance might not be displayed until, for example, the user performs some defined action, such as reading the message, forwarding the message, or the like. In one embodiment, the hop distance determined based on a number of hops the message traversed to the given user might be displayed with the message; but, the hop distance might not be updated if other recipients select to forward the message—until, for example, the given user selects to also forward the message. In one embodiment, the message may be displayed to the user in a rank ordering of messages based on message hop distances.

RCM 355 may be further configured and arranged to manage interest clusters useable in forwarding messages. RCM 355 might interact with data store 352, and/or receive information from a client device that is useable to identify users within a contact list. RCM 355 might employ the information within a contact list to identify recipients of a message.

As messages are sent between client devices, RCM 355 might monitor for and/or receive notice of responses by users receiving the messages. RCM 355 may then use the response information to manage membership to one or more interest clusters. RCM 355 may further provide access to the interest clusters to users of client devices for forwarding messages based, in part, on the membership of the interest clusters associated with the message to be forwarded.

RCM 355 may also be configured and arranged to parse a message to determine one or more interest clusters associated with the message. In one embodiment, RCM 355 may search for keywords, names, phrases, or the like, that may be useable to identify one or more interest clusters for the message.

Generalized Operation

Figure 4:
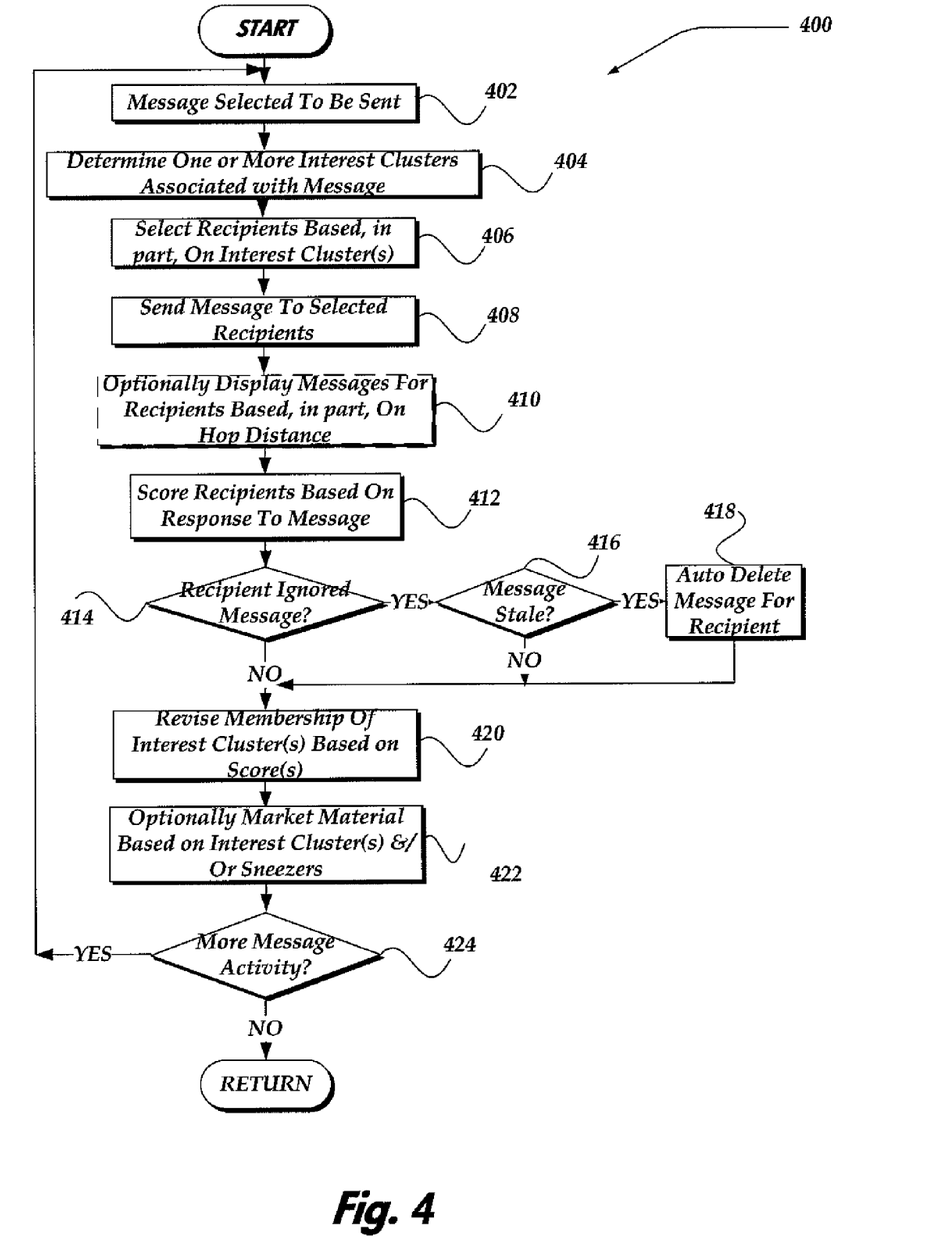
FIG. 4 illustrates a logical flow diagram generally showing one embodiment of a process for managing messages using generated interest clusters based on responses of a message recipient to the received message.

The operation of certain aspects of the invention will now be described with respect to FIG. 4. FIG. 4 illustrates a logical flow diagram generally showing one embodiment of a process for managing messages using generated interest clusters based on responses of a message recipient to the received message. Process 400 of FIG. 4 may be implemented, for example, within cluster service 106 of FIG. 1.

Figure 6:
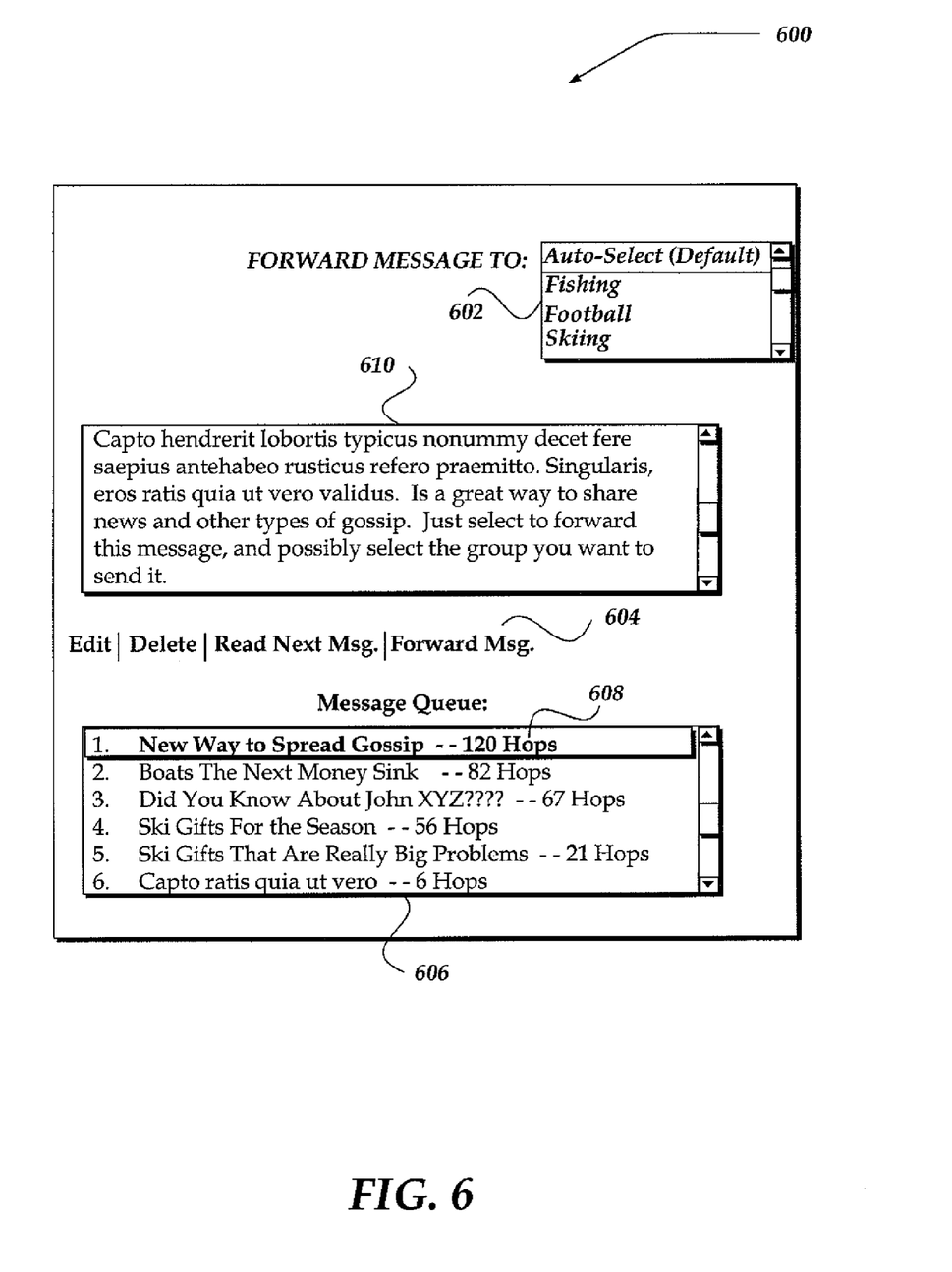
FIG. 6 illustrates an example interface usable for managing messages using generated interest clusters.

Process 400 may begin, after a start block, at block 402, where a user may select to have a message sent to others. In one embodiment, an interface may be provided to a user to enable the user to post or otherwise send a message. One embodiment of such an interface is illustrated in FIG. 6. However, other interfaces may also be used.

The message may be one that the user received from another user, or one that the user has composed. For example, the user might have viewed something, heard something, or the like, of interest, and wants to share the information. The user might insert content into a message body, including a link to an article, other content, or the like. The user may then select an icon, or the like, to request that the message be sent. In another embodiment, the user might read a received message and select to have that received message be forwarded. In one embodiment, the user might modify the message by including additional information in an associated message body, subject line, or the like.

Processing then flows to block 404, where a determination is made as to which interest cluster(s) are associated with the message. In one embodiment, a data store, or the like, may include information for which interest cluster(s) the message is associated. Such information may have been determined by a prior action, such as from a previous sender of the message, or the like. In another embodiment, an analysis may be performed on the message to determine one or more interest clusters associated with the message. The analysis may be performed using any of a variety of mechanisms. For example, one mechanism may include parsing the body of the message, a subject line of the message, following links within the message and parsing resulting content obtained, or the like. The parsed content may include keywords, phrases, names, or the like, that may be useable to determine one or more interest clusters.

In one embodiment, the interest clusters may already have been established. In which instance, the parsing enables the message to be associated with the earlier established interest clusters. In another embodiment, at least some of the parsed content may result in creating at least one new interest cluster. In which case, the new interest cluster might have no member users associated with it. It may also be the case that an earlier established interest cluster might also include an empty membership.

Process 400 moves next to block 406, where recipients are determined based, in part, on the interest cluster(s). In one embodiment, as noted above, membership to the interest cluster might be empty. In such a situation, the recipients may be determined based on a variety of mechanisms. For example, in one embodiment, the recipients might be selected from the sender's contact list. In one embodiment, all the users in the sender's contact list might be identified to receive the message. However, in another embodiment, where users within the contact list are tagged, the tags might be used to identify recipients. For example, some users in the sender's contact list might be identified as employees, co-workers, church friends, family, game buddies, or the like. Such tags may then be used to select a sub-set of users within the sender's contact list.

In another embodiment, the membership to the interest cluster might not be empty. In which instance, the membership might be compared to the sender's contact list. If no one within the sender's contact list is included within the membership, a variety of actions may be performed. In one embodiment, a determination might be made to detect if any of the users in the contact list have responded to previous messages in the associated interest cluster(s). If so, then it might indicate that the users had ignored or deleted the previous messages without reading them. In such situations, it may indicate further that these users may not be interested in receiving farther messages for the associated interest clusters. In that case, these identified users might not be included as recipients to the present message. In another embodiment, if none of the users are identified as having received previous messages associated with the interest cluster(s) for the present message, then, each user in the contact list might be included as recipients. In one embodiment, the added recipients from the sender's contact list might initially be added as members to the associated interest clusters. In another embodiment, the recipients might simply be identified to receive the message, in addition to those in the interest cluster (s), but not added as members to the interest cluster(s). In still another embodiment, the contact list might not be employed to supplement the membership identified for the interest cluster(s).

In one embodiment, a display of interest clusters may be provided to the sender for use in selecting one or more interest clusters (and therefore recipients) for the message. One embodiment of employing existing interest clusters for selecting the set of recipients of the message is illustrated in FIG. 6. Shown in FIG. 6 is a non-exhaustive example of a user interface 600 displayable at a client device. Interface 600 includes an interest cluster selection mechanism 602. In one embodiment, the selection mechanism 602 may be a menu showing existing interest clusters. In one embodiment, the list of interest clusters shown in selection mechanism 602 might include those interest clusters for which the sender is currently a member. In one embodiment, the list might include interest clusters for which the sender might not be a member, but are selected based on interest clusters determined for the message at block 404. In another embodiment, the selection mechanism 602 might show an empty set of interest clusters, where the sender is not a member to any interest clusters, or the message is determined to be unassociated with any interest clusters for which the sender is currently a member. Other variations may also be employed, without departing from the scope of the invention. Moreover, while selection mechanism 602 is shown as a scrollable menu, the invention may employ other mechanisms, including, but not limited to a searchable field, a text enterable field, or the like.

Returning to FIG. 4, process 400 flows next to block 408, where the message is sent to the selected recipients. In one embodiment, the message might be sent anonymously, rather than indicating the actual sender as the source of the message. For example, in one embodiment, a name of the interest cluster might be identified as the source of the message.

Processing continues to block 410, where a hop distance may be determined in real-time for the message. In one embodiment, the hop distance may be determined based on a count of each request received to forward the message. Thus, if the message was requested to be forwarded to the user by a previous user, the hop distance might be initially at least one. When the present user requests that the message be forwarded, independent of the number of potential recipients the message is to be forwarded to, the hop distance would increase by one, and so forth. In another embodiment, the hop distance may be updated as the message is received by a recipient, as the message is sent, or any of a variety of timing points in the process of sending/receiving the message. In addition, an interface at the recipient's client device may be configured to display the message based on the hop distance. For example, FIG. 6 illustrates an example interface usable for managing messages using generated interest clusters. Shown in FIG. 6 is message queue 606 with a plurality of messages, each message having an associated hop distance, such as hop distance 608. In one embodiment, the messages may be displayed in a rank ordering based on the hop distances. In another embodiment, the hop distances may be displayed with the messages, however, in yet another embodiment, the hop distance may be hidden. In one embodiment, determination and/or use of the hop distance may be optional.

Returning to FIG. 4, process 400 flows to block 412, where recipients of the message may receive a score based on their response to the message. Scoring responses may be performed in any of a variety of ways directed towards determining interest or affinity to a subject of the message (and therefore the interest cluster(s)). One possible, non-limiting, mechanism for scoring responses might be to monitor whether the recipient forwards the message, reads the message, ignores the message for a defined time period, and/or deletes the message unread. Various rating scores may be placed on these actions. For example, if the recipient selects to forward the message, the recipient may be deemed to express an interest in the subject of the message, and may receive a first score or highest score. For example, the high score might be a plus two, or the like. If the recipient selects instead to read the message, but not forward it, the recipient may have expressed a somewhat lesser interest in the subject of the message. Therefore, the recipient might receive a score for the associated interest clusters of some value less than the score for forwarding the message. For example, the score might be one. If the recipient selects to ignore the message, the recipient might be deemed to be ambivalent about the message. The score might be set to, for example, a zero. Similarly, a recipient that merely deletes the message unread might be deemed to have no interest in the message. The score might be set, for example, to a negative value. It should be clear that any values may be used as score values, and the invention is therefore not limited in any manner by such examples values.

In any event, processing next flows to decision block 414, where a determination is made whether the message is ignored by the recipient for some defined time period. If not, then processing flows to block 420; otherwise, processing may flow to decision block 416, where a determination is made whether the message is stale. A message may be determined to be stale if the message remains in a recipient's message queue beyond a second defined time period, has a hop distance below a threshold, or any of a variety of other criteria. In any event, if the message is determined to be stale, processing flows to block 418; otherwise, processing flows to block 420. At block 418, the stale message may be deleted from the recipient's message queue, moved to a stale message folder, or the like. Processing then flows to block 420.

At block 420, membership to one or more interest clusters associated with the message may be revised based on the responses of the recipients of the message. Thus, those recipients with a first score, based on forwarding the message, may be added to the membership of the one or more interest clusters. Additionally, such recipients may be uniquely identified into a class known as sneezers, as they appear to indicate an increased likelihood over other recipients to forward messages.

Similarly, recipients that read the message (e.g., having the second score value) may be added to the one or more interest clusters. Those recipients that ignored the message (e.g., having a third score value) may be optionally added, left as a member if currently a member, or optionally removed from the membership of the one or more interest clusters. Such optional selection may be based on a variety of criteria. For example, in one embodiment, this recipient may be initially added and based on responses to subsequent messages associated with the same one or more interest clusters may be removed. Thus, for example, continually ignoring messages may indicate a "don't care" approach to the one or more interest clusters. As such, it may be appropriate to not continue to send messages for the one or more interest clusters to these recipients. However, other actions may be performed for those recipients that ignore the messages for the one or more interest clusters, including, but not limited to maintaining their membership in the one or more interest clusters, until they select to change their responses. For example, if this type of recipient now starts to delete each received message for the one or more interest clusters, then the recipient may be removed. Similarly, those recipients that have a low score, such as a result of deleting the messages, may be removed from, or not ever added as, a member to the one or more interest clusters. Such membership changes may occur each time the message is forwarded to another set of recipients. In this manner, the membership may be dynamic, including friends, friends of friends, and so forth, such that there may be members in an interest cluster that are not in a sender/recipient's contact list. Thus, in one embodiment, interest clusters may be made available to a plurality of users within a social network. In one embodiment, the membership may be stored or otherwise accessed from a remote network device to each client device.

In one embodiment, a user of the interest cluster might not be able to determine who is a member of the interest cluster. Moreover, in one embodiment, membership to the interest cluster might be determined based on a response to a message associated with the interest cluster, rather than enabling one or more users to explicitly edit the membership.

Interest clusters may appear and disappear over time. Interest clusters may initially appear, for example, based on a determination of interest clusters, such as described above at block 404. Interest clusters may also disappear based on responses over time of members to messages. For example, as members select to ignore or delete messages from an interest cluster, the membership may diminish. Over time, it is possible that only a few members may exist for the interest cluster, such as a sneezer, or the like. Where the membership has diminished to below a defined value, in one embodiment, the interest cluster may be automatically deleted. Subsequent messages that may be determined to be associated with the deleted interest cluster might then be associated with a different interest cluster. In another embodiment, the message might be sent based on the sender selecting the recipients, or the recipients being automatically selected from the sender's contact list, as described above.

In any event, process 400 may move to block 422, where optionally, third parties may employ interest clusters and/or sneezers to send messages. Third parties typically include those entities, not a member to the interest cluster. Thus, a merchant, educational entity, or the like, may employ the interest clusters, and/or sneezers to send marketing material, advertising material, educational material, or the like. In this manner, the material may be directed to interest clusters that might be more interested in the content. Of course, members to an interest cluster, and/or sneezers may also send similar content using other sneezers, and/or interest clusters.

Processing flows next to decision block 424, where a determination is made whether more message activity is to be managed. Such might arise, for example, as a message is forwarded through the social network, new messages are created and sent, or the like. If there is more activity, processing loops back to block 402; otherwise, processing returns to a calling process to perform other actions.

It will be understood that each block of the flowchart illustration, and combinations of blocks in the flowchart illustration, can be implemented by computer program instructions. These program instructions may be provided to a processor to produce a machine, such that the instructions, which execute on the processor, create means for implementing the actions specified in the flowchart block or blocks. The computer program instructions may be executed by a processor to cause a series of operational steps to be performed by the processor to produce a computer implemented process such that the instructions, which execute on the processor to provide steps for implementing the actions specified in the flowchart block or blocks. The computer program instructions may also cause at least some of the operational steps shown in the blocks of the flowchart to be performed in parallel. Moreover, some of the steps may also be performed across more than one processor, such as might arise in a multi-processor computer system. In addition, one or more blocks or combinations of blocks in the flowchart illustration may also be performed concurrently with other blocks or combinations of blocks, or even in a different sequence than illustrated without departing from the scope or spirit of the invention.

Accordingly, blocks of the flowchart illustration support combinations of means for performing the specified actions, combinations of steps for performing the specified actions and program instruction means for performing the specified actions. It will also be understood that each block of the flowchart illustration, and combinations of blocks in the flowchart illustration, can be implemented by special purpose hardware-based systems which perform the specified actions or steps, or combinations of special purpose hardware and computer instructions.

Illustrated Examples & User Interface

Figure 5:
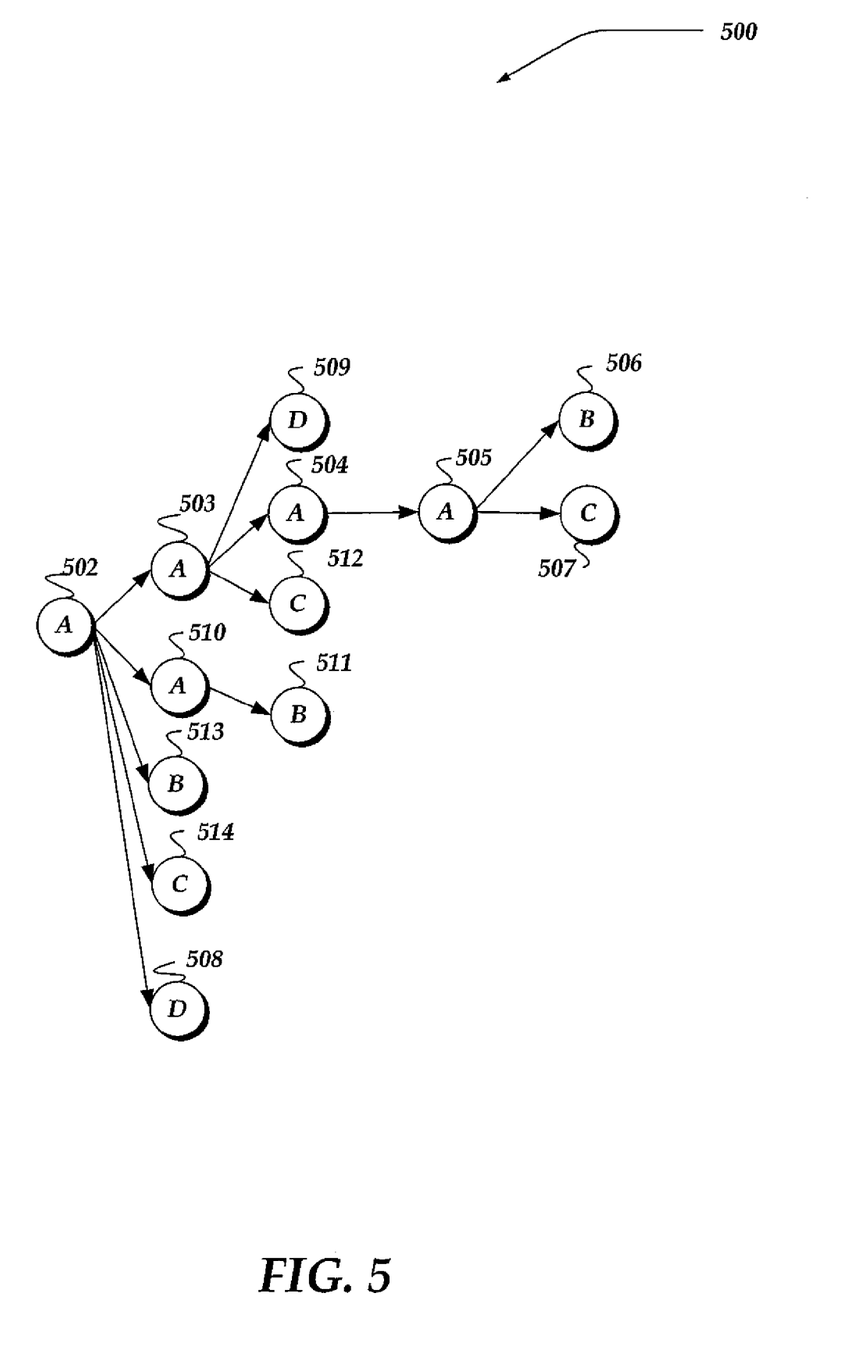
FIG. 5 illustrates a relational diagram generally showing an example embodiment as a message is forwarded through a social network.

Other aspects of the invention will now be described with respect to FIGS. 5-6. FIG. 5 illustrates a relational diagram generally showing an example embodiment of a message forwarded through a social network.

As shown in FIG. 5, a social network 600 may include a plurality of users 502-514. As may be seen in the non-exhaustive example, included within user 502's contact list might be users 503, 508, 510, and 513-514. Included within user 510's contact list might be user 511. Included within user 503's contact list might be users 509, 504, and 512. Similarly, within user 504's contact list might be user 505, and within user 505's contact list might be users 506-507. Thus, social network 600 may represent direct and indirect personal relationships, such as described above.

User 502 might select to send a message. If membership to interest cluster(s) determined for the message are empty, user 502's contact list might be employed to automatically select the recipients of the message. The message may then be sent to these users. The users may, as shown in this example, have varied responses to the message. For example, those users labeled with the letter "A" represent those users that forward the received message to another user. Thus, users 503 and 510 are identified as forwarding the message. These users may automatically be added as members to the interest cluster(s) associated with the message. User 502 may automatically also be added as a member. User 513 may have selected to read the message without forwarding it. As such, user 513 response is identified with the letter "B." User 514 might have ignored the message, while user 508 might have deleted the message without reading it. As such, user 514 and 508 have been labeled based on their responses with the letters "C" and "D." Using these letters (perhaps as a mechanism for scoring the responses, in one embodiment), membership to the interest cluster(s) may be revised. Thus, user 513 may be added to the interest cluster(s), while user 514 might optionally be added or not, and user 508 would not be added.

As the message is forwarded, subsequent recipients may be scored (as illustrated by the lettering) and membership to the interest cluster(s) revised, based on subsequent responses by each recipient. User 502, or other members to the interest cluster, might then send messages to other members. Thus, for example, user 502 might now be enabled to send messages for the interest cluster(s) to users 503-507, 510-511, and 513.

The invention is not limited by this example, however. For example, in one embodiment, recipients of messages from user 502 might be selected from those members of the interest cluster that are also within user 502's contact list. Thus, user 502 might automatically send the message to users 503, 510, and 513. Each of these users would similarly have recipients for their messages selected from the intersection of user in their contact list that are also a member of the interest cluster. Thus, user 513 might have an empty set, while user 503 might be able to send the message to user 504, and so forth. Thus, interest clusters, and forwarding rules are not limited by the above examples, and any of a variety of other approaches and uses of interest clusters are also useable and are within the scope of the invention.

FIG. 6 illustrates an example interface useable for managing messages using generated interest clusters. Interface 600 is but one of a variety of interfaces, and therefore is not to be construed as limiting the invention. However, as illustrated, interface 600 includes interest cluster selection mechanism 602 as described above, message queue 606 also described above, action selectors 604, and a message display 610. Action selectors 604 represent virtually any mechanism useable to select an action to be performed on a message, including, but not limited to editing a message, deleting a message, reading a message, or even forwarding a message. Message display 610 may represent any mechanism useable to read and/or edit, and/or compose a message.

In one embodiment, interface 600 may be provided through a component downloaded onto a client device, such as client devices 101-104. In another embodiment, interface 600 might be displayed within a browser window from a remote network device, or the like. Thus, interface 600 may be accessible from a client device using a variety of mechanisms, included, but not limited to a combination of a client component and a remote network device.

The above specification, examples, and data provide a complete description of the manufacture and use of the composition of the invention. Since many embodiments of the invention can be made without departing from the spirit and scope of the invention, the invention resides in the claims hereinafter appended.

What is claimed as new and desired to be protected by Letters Patent of the United States is:

1. A network device to manage a communications over a network, comprising:
   a transceiver to send and receive data over a network; and
   a processor that is operative to perform actions, comprising:
      receiving a request to forward a message over the network;
      determining one or more interest clusters with which the message is associated;
      sending the message based on an automatic determination of one or more recipients to whom the message is to be sent based, in part, on a membership of the one or more recipients to the one or more interest clusters;
      automatically revising the membership to the one or more interest clusters based, in part, on how a one of the one or more recipients of the message responds to the message, such that the revised membership is useable to manage a subsequent message; and
      adding a first recipient of the one or more recipients as a member to the one or more interest clusters associated with the message in response to the first recipient forwarding the message.

2. The network device of claim 1, wherein determining one or more interest clusters further comprises:
   performing an analysis based on a content of the message to identify the one or more interest clusters; and
   if at least one of the one or more interest clusters is undefined, creating the undefined interest cluster.

3. The network device of claim 1, wherein revising the membership based on how the one of the one or more recipients responds further comprises:
- adding a recipient of the one or more recipients as a member to the one or more interest clusters associated with the message in response to the recipient reading the message and failing to forward the message;
- selectively including a recipient of the one or more recipients in the one or more interest clusters in response to the recipient ignoring the message; and
- selectively removing a recipient from the one or more interest clusters associated with the message in response to the recipient deleting the message unread.

4. The network device of claim 1, wherein determining to whom the message is to be sent further comprises:
- if at least one user is unassociated with the one or more interest clusters, automatically sending the message to one or more users identified with a contact list associated with a user requesting the message to be forwarded; and
- if one or more users are associated with the one or more interest clusters, sending the message to each member identified within the one or more interest clusters, and ensuring that the message is not sent to a same member multiple times by the user requesting the message to be forwarded.

5. The network device of claim 1, wherein automatically revising the membership further comprises:
- if a member of an interest cluster fails to read or forward a subsequent message associated with one or more interest clusters, selectively removing the member from the interest cluster.

6. The network device of claim 1, wherein the processor is operative to perform actions, further including:
- automatically classifying each recipient into sneezer class of members for at least one interest cluster if the recipient forwards the message; and
- sending at least one marketing material to members within the sneezer class for the at least one interest cluster.

7. A network device to manage a communications over a network, comprising:
- a transceiver to send and receive data over a network; and
- a processor that is operative to perform actions, comprising:
  - receiving a request to forward a message over the network;
  - determining one or more interest clusters with which the message is associated;
  - sending the message based on an automatic determination of to whom the message is to be sent based, in part, on a membership to the one or more interest clusters; and
  - automatically revising the membership to the one or more interest clusters based, in part, on how a recipient of the message responds to the message, such that the revised membership is useable to manage a subsequent message, wherein automatically revising a membership further comprises:
    - selectively removing a member from an interest cluster in response to the member of the interest cluster failing to read or forward a subsequent message associated with the interest cluster.

8. A network device to manage a communications over a network, comprising:
- a transceiver to send and receive data over a network; and
- a processor that is operative to perform actions, comprising:
  - receiving a request to forward a message over the network;
  - determining one or more interest clusters with which the message is associated;
  - sending the message based on an automatic determination of to whom the message is to be sent based, in part, on a membership to the one or more interest clusters;
  - automatically revising the membership to the one or more interest clusters based, in part, on how a recipient of the message responds to the message, such that the revised membership is useable to manage a subsequent message; and
  - adding the recipient as a member to the one or more interest clusters associated with the message in response to the recipient reading the message and failing to forward the message.

* * * * *